United States Patent
Harlow et al.

(10) Patent No.: US 8,639,584 B2
(45) Date of Patent: *Jan. 28, 2014

(54) SYSTEM AND METHODS FOR PURCHASING SERVICES

(75) Inventors: John Bruce Harlow, Middletown, NJ (US); Robert Sayko, Colts Neck, NJ (US); Norman Shaye, Lakewood, NJ (US); Richard A. Stubing, West Long Branch, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/539,710

(22) Filed: Jul. 2, 2012

(65) Prior Publication Data

US 2012/0330738 A1 Dec. 27, 2012

Related U.S. Application Data

(60) Continuation of application No. 11/320,102, filed on Dec. 28, 2005, now Pat. No. 8,239,281, which is a division of application No. 10/120,304, filed on Apr. 10, 2002, now abandoned.

(51) Int. Cl.
G06Q 30/00 (2012.01)
(52) U.S. Cl.
USPC ................ 705/26.41; 705/26.1; 705/27.1
(58) Field of Classification Search
USPC .................................................. 705/26, 27
See application file for complete search history.

(56) References Cited

U.S. PATENT DOCUMENTS

| 5,513,117 | A | 4/1996 | Small |
| 6,890,181 | B2 | 5/2005 | Warneke et al. |
| 2002/0032905 | A1 | 3/2002 | Sherr et al. |
| 2002/0110796 | A1 | 8/2002 | Sugano et al. |
| 2002/0111912 | A1 | 8/2002 | Hunter et al. |
| 2003/0004815 | A1* | 1/2003 | Sakai et al. ............ 705/26 |
| 2004/0230495 | A1 | 11/2004 | Lotvin et al. |
| 2006/0190966 | A1 | 8/2006 | McKissick et al. |

OTHER PUBLICATIONS

PR Newswire: "Blackboard Campus (TM) Makes the Online Campus a Reality for Teaching and Learning—Anytime, Anywhere", Apr. 8, 1999; Proquest #40368001, 4 pages.

* cited by examiner

*Primary Examiner* — Rob Pond
(74) *Attorney, Agent, or Firm* — Wolff & Samson, PC

(57) ABSTRACT

A service provider system enables a subscriber to purchase services over a network from a service provider for the benefit of third parties located in different locations. The service provider system provides service flexibility by allowing parameters to be set, such as place and time of service delivery. Further, conditions allowing third-party recipients to change service parameters include delivery time and place, exchange of purchased service for another service, return of the purchased service, etc. Reporting options to both the subscriber and the third party can additionally be provided. Reporting messages or notifications may be sent to the purchasing subscriber to indicate which of the third parties had taken advantage of the purchased service, when and where the service was consumed, and/or what the actual cost of delivering the service was. The service provider system can also provide incentives for third parties to take advantage of the purchased service.

18 Claims, 5 Drawing Sheets

| | |
|---|---|
| 402 | PURCHASER IDENTIFICATION |
| 404 | ACCOUNT NUMBER |
| 406 | SERVICE IDENTIFICATION |
| 408 | THIRD-PARTY IDENTIFICATION LIST |
| | 1. PARTY IDENTIFICATION<br>2. PARTY IDENTIFICATION<br>⋮ |
| 410 | CONDITIONS |
| | CONDITION 1 |
| | CONDITION 2 |
| 412 | INCENTIVE REWARDS |
| | CONDITION 1 |
| | CONDITION 2 |
| | REWARD 1<br>REWARD 2<br>⋮ |
| 414 | REPORT AND ALERT PARAMETERS |
| | |

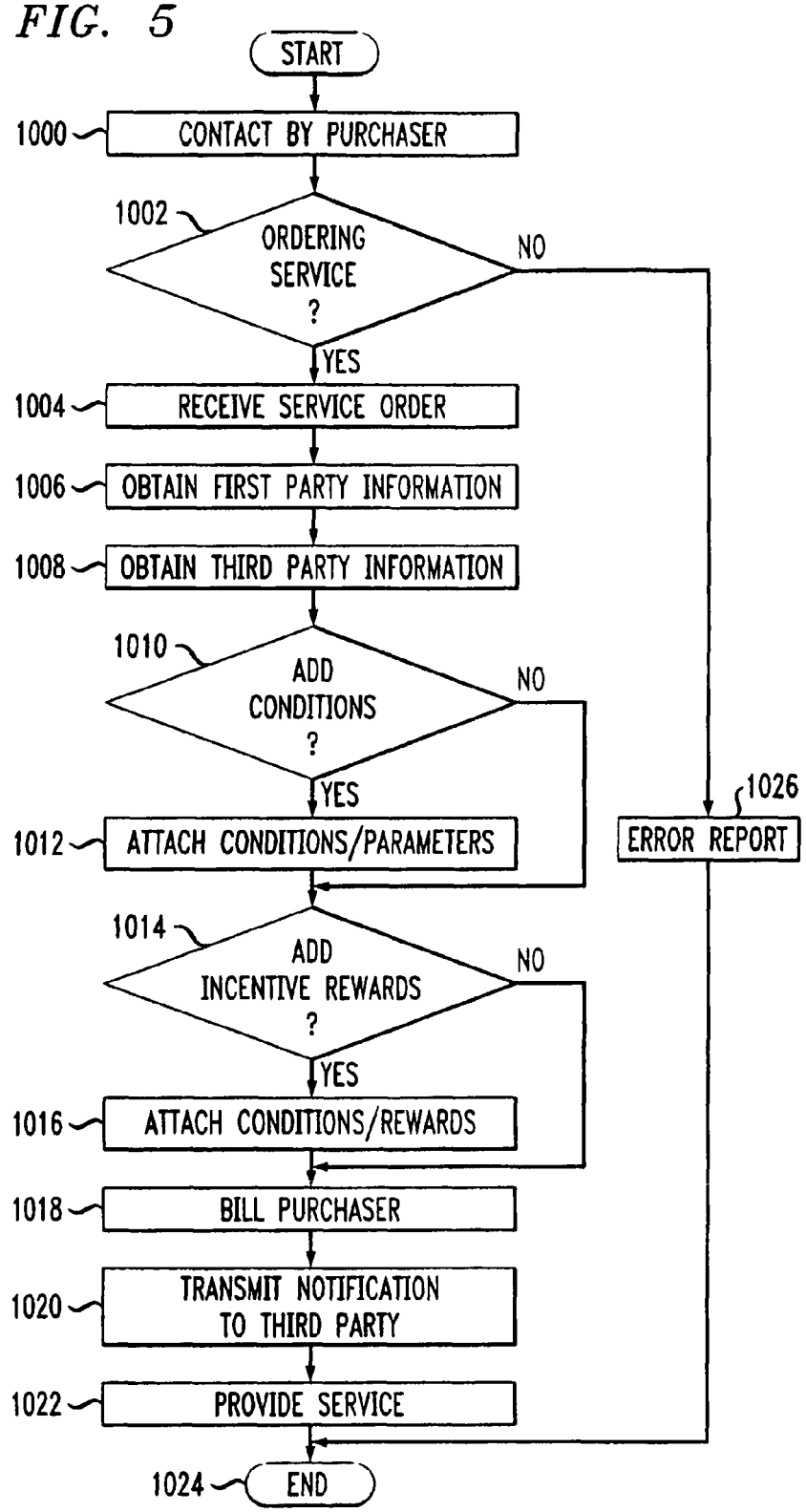

SYSTEM AND METHODS FOR PURCHASING SERVICES

This application is a continuation of U.S. patent application Ser. No. 11/320,102, filed Dec. 28, 2005, which is a divisional application of U.S. patent application Ser. No. 10/120,304, filed Apr. 10, 2002, both of which are entirely incorporated herein by reference.

BACKGROUND OF THE INVENTION

1. Field of Invention

This invention relates to a system and method for purchasing services for one or more third parties.

2. Description of Related Art

Currently consumers may purchase services from a service provider by charging the cost for the service to a previously established or currently existing account. For example, a consumer can order a pay-per-view movie or event that can then be automatically charged to that consumer's account. Such pay-per-view services are generally linked to a customer's on-site equipment, such as a cable TV box, or the customer's phone number or address. While a service, such as the above-described pay-per-view service, is generally very convenient, it can be restrictive if the customer desires to order a movie for a location other than in their home.

SUMMARY OF THE INVENTION

The present invention is directed to a third party purchase system that enables a subscriber to purchase services over a network from a service provider for the benefit of one or more third parties. Accordingly, a subscriber can purchase a service, such as a pay-per-view movie, for one or more third parties who may subsequently view the movie at a remote location. Types of services can include pay-for-view movies or telecommunications (cell phone, pager, voice mail, Internet connection, etc.), as well as any other service that may be purchased over a network.

Additionally, the subscriber can place conditions on the use of the purchased services. For example, if the purchased service is a pay-for-view movie, the purchaser may specify place and/or time as a condition. If more than one consumer is involved, the purchaser may supply a list to the service provider system that specifies the place and time corresponding to each of the third parties. In addition to time and place of the use of the service, the subscriber can set parameters to provide flexibility in specified conditions, such as changing service delivery time and place, exchanging the purchased service for another service, returning the purchased service, etc.

The service provider system may provide reporting options to both the subscriber and the third party. For example, an alert may be sent to each of the third parties designated by the purchasing subscriber that a service has been purchased on their behalf. Personalized messages may also be delivered for the consumers, such as "Happy Birthday, enjoy your favorite movie," for example. Reporting messages or notifications may be sent to the purchasing subscriber to indicate which of the third parties had taken advantage of the purchased service, when and where the service was consumed, and/or what the actual cost of delivering the service was, for example.

The present invention can also provide incentives for third parties to take advantage of the purchased service. For example, the third party may be given a reward for viewing a documentary movie purchased by a teacher of a class. If the third parties (students) viewed the documentary, then a preset amount may be credited to each third party's account for future viewing of the third party's choice. Other types of reward may also be included, such as crediting credit card accounts, cash cards, etc. In this way, the purchasing subscriber may motivate or otherwise encourage third parties to take advantage of the purchased service. Another important aspect to this is that the purchasing party can pay for an enhanced service level—for example, buying for the customer a way to view a program in HDTV as opposed to normal TV quality of service or enhanced quality of service for a game (256 KB service as opposed to 128 KB service). Thus, your Ford dealer might purchase for you the super-deluxe interactive "like you are there" test drive of their new Mustang feature over the Internet.

BRIEF DESCRIPTION OF THE DRAWINGS

The invention will be described, with reference to the following figures, wherein like numerals represent like elements, and wherein:

FIG. 3 is an exemplary data structure of a purchase request;

FIG. 5 is a flowchart of an exemplary process of ordering a service.

DETAILED DESCRIPTION OF PREFERRED EMBODIMENTS

Figure 1:
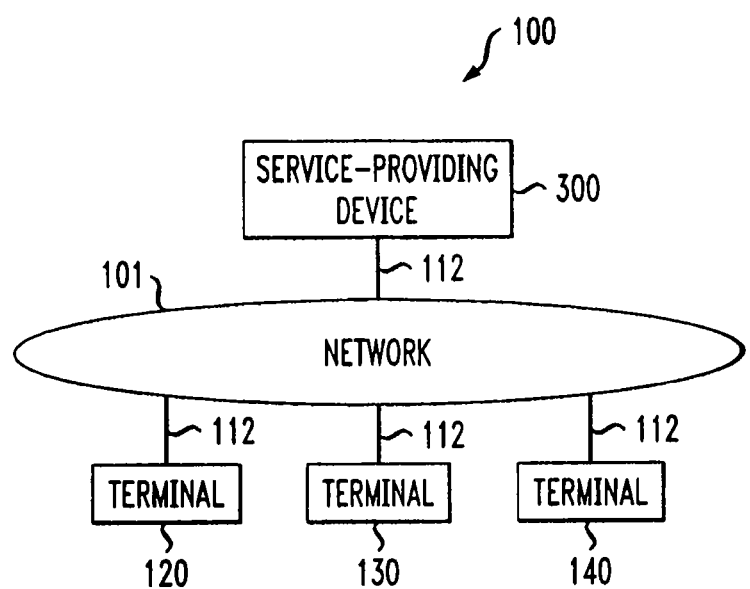
FIG. 1 is an exemplary block diagram of a third-party purchase system in accordance with the present invention.

FIG. 1 shows an exemplary block diagram of a third-party purchase system 100 that can include a network 101 and a service-providing device 300, coupled to the network 101. The system 100 can further include a plurality of terminals 120, 130, 140 that can also be connected with the network 101 via communication links 112.

The service-providing device 300 can be a service provider itself or be coupled to a service provider in order to selectively provide services to the terminals 120-140 via the network 101. Further, the service-providing device 300 can receive a request for services from a subscriber, such as through terminals 120-140. The request can include the designation of one or more terminals 120-140 to which the services should be transmitted. Based on the request, the service-providing device 300 can provide a service, such as a pay-per-view movie, to one or more of the terminals 120-140.

Additionally, the request for services can further include parameters that can, for example, direct service-providing device 300 to perform services within a set amount of time. The parameters can also direct the service providing device 300 to request some form of identification of the third party, prior to providing a service. Further, the parameters can include messages, such as video, audio and/or text messages, for the third party receiving the service. The request can include the download, to the viewer's device, of a "better" CODEC. This might be a one-time use CODEC (self-destructing or other limitation built in). So the purchaser can either provide both the service (e.g., game, movie) and capability (e.g., CODEC) or just one of the two.

While the service-providing device 300 is shown as an independent unit coupled to the network 101, it can also be incorporated into the terminals 120-140, and/or may be distributed throughout the network 101. For example, the service-providing device may be made part of the various central offices or servers (not shown) employed by the network 101 which are distributed throughout the network 101. Any configuration that permits the purchase of services for a third party can be used without departing from the spirit and scope of the present invention.

The terminals 120-140 may be devices of any type that allow for the transmission and/or reception of signals. For example, the terminals 120-140 may include, but are not limited to, cable television, Internet over TV set-top boxes, digital set-top audio-video decoders, screen-equipped web phones, voice and video telephone sets, integrated intelligent digital television receivers, DBS receivers, personal computers, work stations, personal digital assistants (PDAs), PCS/cellular wireless voice and Internet phones, mobile satellite receivers, or any combination of the above.

As described above, the terminals 120-140 and the service-providing device 300 are in communication with the network 101 through the communication link 112. The communication links 112 can be any type of wired or wireless circuit-oriented link, packet-oriented link, cell-based connection-oriented link or connection list link, including, but not limited to, multiple twisted-pair cables, DSL, coaxial cable, fiber optics, RF cable modems, over-the-air frequency, over-the-air optical wavelength (e.g., infrared), local area networks, wide area networks, intranets, internet, virtual private networks, cable TV, terrestrial broadcast radio or television, satellite transmission, simple direct serial/parallel wired connections, or the like, or any combinations of these.

The network 101 may be a single network or a plurality of networks of the same or different types. For example, the network 101 may include a local telephone network in connection with a long distance telephone network. Further, the network 101 may be a data network or telecommunications or video distribution (e.g., cable, terrestrial broadcast, or satellite) network in connection with a data network. Any combination of telecommunications, video/audio distribution and data networks, whether a global, national, regional, wide-area, local area or in-home network, may be used without departing from the spirit and scope of the present invention.

As an example of operation, consider that an elementary school teacher may want students to watch a specific documentary available on cable TV. The teacher may use the third-party purchase system 100 to purchase the right to view the documentary for each of the students to be viewed at 7:00 PM on Wednesday night. On the Monday before, the teacher may tell the students of the purchase and collect information from each of the student. The information can include an identity of each of the students and/or address of each student's set-top box that can be provided to the service-providing device 300 along with a purchase request.

Alternatively, the teacher may receive a set of keys from the service-providing device 300 in response to a purchase request. In class, the teacher may distribute the keys to the students for use with their respective set-top boxes, for example. The keys may be any program, code, or device that permits the teacher to authorize the students to view the service. Examples of keys can include passwords or a card with information on a magnetic strip. If so equipped, any set-top box may read information on the card to verify access permission. As an incentive for the student to watch the documentary, the teacher may specify that if a student watches the complete documentary at the specified time, then the student may be rewarded with another movie of their choice to be paid for by the teacher. Another word for "keys" (at least as the term is used in this paragraph) is "credential" (which is a well-known industry term)

On Wednesday at 7:00 PM, as the students turn on their televisions and watch the documentary movie, the third-party purchase system 100 can monitor which of the students received the documentary and for how long the students received the transmission. The teacher can be provided with a report for each student based on the monitoring information, and messages regarding rewards may be sent to those students that meet the requirements specified by the teacher. Additionally, the students can be prompted by a series of questions about the documentary during and/or after the documentary. The responses of the students can be recorded and also reported to the teacher. The credential facilitates this because it can be associated directly with an individual student.

For the above example, the teacher may have granted more flexibility to the students, such as giving the students choices of when to view the documentary or which of a selected class of documentaries to view. Thus, the service-providing device 300 may allow the purchasing subscriber to specify any type of conditions that may be placed on the use of the purchased service.

While the above example used pay-per-view movies as an example, any type of service that may be purchased and/or controlled over a network may be included. For example, if so equipped, a car rental service may be integrated with a network where a purchaser may lease for a third party a rental car for a specified period of time, to be used in a specified geographic area, and to be driven below a certain speed (e.g., 55 mph). If, for example, the car includes controls that are integrated with a GPS system and interfaces that permit downloads of instructions from a wireless network, then the purchaser's specifications may be downloaded to the rental car when the third party arrives to pickup the car.

For example, the above rental car example may benefit a parent of a college student. The parent may want the student to take a trip to visit an aging grandparent, for example. However, not wanting the college student to take advantage of the situation, the parent may specify that the car can only be permitted to travel along the road that leads to the grandparent's home and in the geographic area of the grandparent's home. In this way, controlled degrees of freedom may be dispensed to the college student while avoiding possible adverse circumstances.

Figure 2:
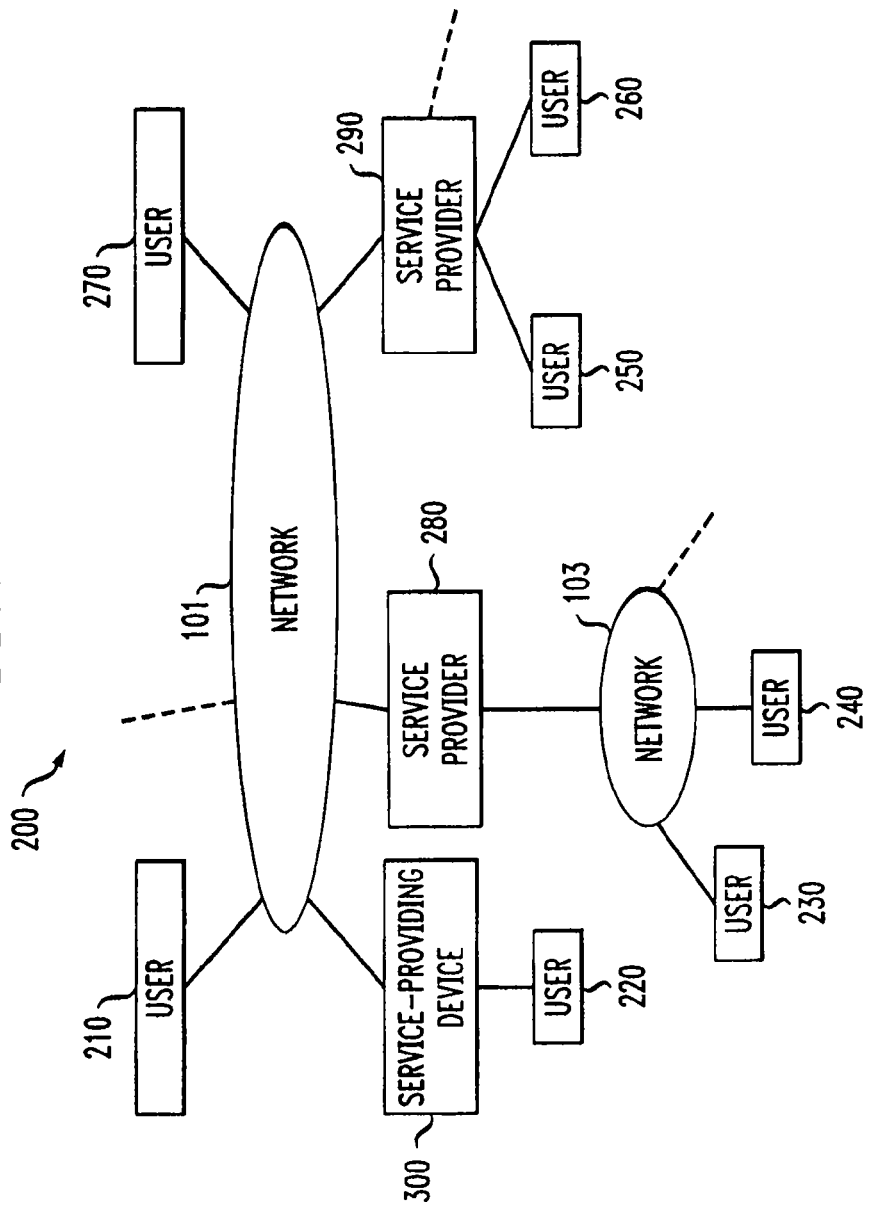
FIG. 2 is a more detailed exemplary diagram of an embodiment of a third-party purchase system.

FIG. 2 shows a more detailed exemplary block diagram of a service-providing system 200. The system can include users 210-270, service providers 280-290, and networks 101 and 103.

When the user 210 desires to purchase a service offered by the service provider 280 for users 230 and 240, for example, a purchase request may be sent to the service-providing device 300. As described above, the purchase request may include all the necessary information, such as identification of the third parties that are to receive the service, the conditions under which the service is to be consumed, and any alerting or reporting options that are desired. The service may then be provided by the service provider 280 to the users 230, 240 using the network 103.

FIG. 3 shows an exemplary data structure of a purchase request 400 that includes a purchase identification 402, an account number 404, a service identification 406, a third-party identification list 408, conditions 410, incentive rewards 412, and report and alert parameters 414. The purchaser identification 402 may be an identification issued to the user when subscribing to the third-party purchase system 100. Other types of identifications may be used, such as the purchaser's Social Security number, for example.

The account number 404 identifies an account to which charges may be debited. This account number 404 may be a number assigned by the third-party purchase system 100 or a charge account number of a financial organization. For example, the account number may be a credit account number, such as a Visa or American Express account, or simply a debit card number, where money is debited from a bank account.

The service identification 406 indicates a service that is being purchased by the purchasing subscriber. If the service-providing system 200 is an independent organization from the service providers 280, 290, then a list may be individually compiled for all the participating service providers 280, 290. Such a list may be organized into service areas and may be presented in a menu format for the purchasing subscriber's convenience when constructing the purchase request Each item in the list may be associated with an identification, and this identification may be placed in the purchase request 400 as the service identification 406.

The service-providing system 200 may offer more sophisticated service selection options such that the purchasing subscriber may only be required to enter some generic name, such as "Tarzan movie", and the service-providing system 200 may locate the most reasonably priced service provider to deliver the requested service. The service-providing system 200 can also maintain user profiles for users so that special preferences may be saved for future use. The user profile may include purchasing provider and/or third-party preferences, such as preferred service providers, quality of service desired, or other information such as third-party lists, etc. For example, a teacher may want to keep a list of students of a class in the profile and update the list as the class changes.

As described above, third-party lists may be kept in a profile and used to initialize the third-party identification list 408 in the purchase request 400. The purchasing subscriber may enter the third-party identification list directly, or if only a single third party is involved, then an identification of the third party may be entered. As described above, the third-party identifications may be a name, a Social Security number, a home address, a set-top box address, a telephone number, and the like.

The conditions 410 include parameters that specify how the purchased service is to be consumed. The parameters are dependent on the type of service that is being purchased. For example, if a pay-per-view movie is being purchased, then time and place of viewing may have meaning. However, if the above-described rental car service is being purchased, then parameters such as speed limit, geographic area, and total mileage are more appropriate. Thus, the types of parameters that may be specified may be determined by either the service purchasing system, or determined by each of the service providers 280, 290 for their respective services. The available parameters may be presented to the first-party purchaser for specification as parameters for the desired service.

The incentive rewards 412 field can include conditions that determine when the third-party consumers should be rewarded. These conditions may be expressed in terms of parameters relating to measurable units. For example, when pay-per-view movies are purchased, the time when the purchased movie was viewed and how much of the movie was received would be appropriate parameters. On the other hand, if a car is rented from a rental car service, the arrival date and time, the number of times that the car speed exceeded 55 mph, etc. may be more appropriate as parameters.

As the purchased service is being consumed by the third parties, the conditions specified in the incentive rewards 412 can be monitored. If the results of the monitoring exceed thresholds that may be set by the purchasing subscriber, then appropriate rewards may be dispensed. As indicated in FIG. 3, there may be multiple conditions that correspond to multiple rewards so that, depending on which of the conditions are met, the third parties may be awarded an appropriate reward.

As mentioned above, the conditions and rewards may be tailored to specific third parties individually. For example, a parent may want all children to watch a particular movie. However, younger children may need more incentive than older children. Thus, the parent may wish to tailor incentives differently for the younger children as compared to the older children. The rewards may also be different since cartoons may be more attractive to the younger children while an educational show or documentary may be better suited for the older children. Thus, the incentive rewards 412 may be directed to the third parties as a whole or to each of the third parties individually.

Similar to the incentive rewards 412, the report and alert parameters 414 may also be directed to all, sub-groups, and/or each individual one of the third parties. Alerts may be a message sent to a third party's TV screen at a specified time, for example. If the third party is a family member and the first-party purchaser wants to surprise the third party with a favorite movie, then a "Happy Birthday" message may be displayed on the third party's screen with a gift message of "Watch Star Trek XX on me." Other mediums of notification may also be used, such as e-mail, facsimile, regular mail or phone call.

A further embodiment of the present invention can include specifying a condition 410 that allows the third party to change the parameters of the service. For example, a condition 410 may provide the third party the ability to exchange a pay-per-view movie received as a gift for another movie selection or to change the time of viewing from that selected by the first party.

Reports may be provided based on the monitoring information and/or billing information. Thus, if the purchasing subscriber is a teacher, then a list of the students that watch an assigned documentary may be provided to the teacher together with data, such as when each student watched the documentary and how much of it was at least received. The reports can also include the results of a student's answers to questions presented during or after the documentary.

In various other exemplary embodiments of the service-providing system 200 shown in FIG. 2, the purchasing subscribers may be any user with access to the networks 101, 103 and/or the service providers 280, 290. For purchasing subscribers 210, 270, for example, with access to the network 101 and who wish to purchase a service for third-party users 250, 260, access to the service provider 290 may be accomplished via the network 101 to place and purchase services. The purchasing subscribers 210, 270 may elect to use the service-providing device 300 to purchase the service. The purchase may then be transmitted using available and/or compatible communication techniques, either known or hereafter developed, to the service provider 290 to be delivered to the third-party users 250, 260 by the service provider 290. Similarly, purchasing subscribers 210, 270 may purchase a service for third-party users 230, 240 by contacting the service provider 280 or using the service-providing device 300.

It should be appreciated from FIG. 2 that service providers may also communicate with each other in order to place orders through other service providers. User 250, for example, may purchase a service for users 230, 240 by using the service provider 290. Service provider 290 may then contact service provider 280 to deliver the service to users 230, 240 using the network 101. For example, a pay-for-view service provider, as a way to attract customers, may offer other services to customers that the pay for view service provider is unable to provide directly, such as car rentals, for example. In this case, the service provider may have an agreement with a car rental service provider that enables pay-for-view customers to go through the pay-for-view service provider to the car rental service provider. This same reciprocal service may be provided to customers of the car rental service provider for pay-for-view movies.

Figure 4:
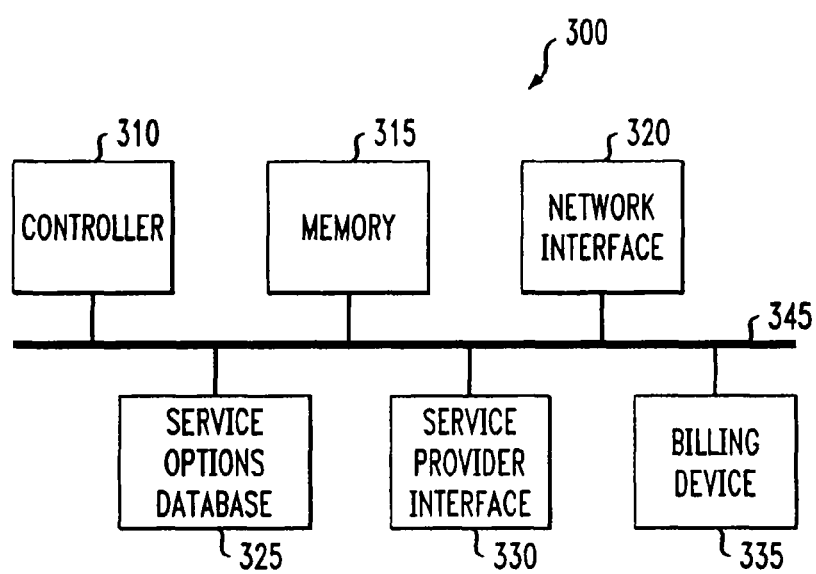
FIG. 4 is an exemplary block diagram of a service-providing device.

FIG. 4 shows an exemplary block diagram illustrating a service-providing device 300. The device 300 can include a controller 310, a memory 315 (which may include large databases shared in a variety of memory types such as disks, tapes, RAM, etc.), a network interface 320, a service options database 325, a service provider interface 330, and a billing device 335. All the components may be coupled together via a bus 345. While FIG. 4 shows the service-providing device 300 using a bus architecture, any other type of architecture may be used as is well-known to one of ordinary skill in the art without departing from the spirit and scope of the present invention.

The controller 310 receives inputs for the purchase of services through the network interface 320 or the service provider interface 330. For example, a parent wishing to purchase a service (cellular phone minutes, for example) for a child at college may access the service-providing device directly or though a data communication network, such as, for example, the Internet. When the service is ordered, the controller 310 may query the subscriber ordering the service for information to complete the order. In addition to names and contact information of the third party receiving the service, this may include the attaching of options, such as conditions on the use of the service and any incentives and/or rewards. For example, the parent ordering cellular minutes may restrict the use of the minutes for phone calls home only. If the child uses the phone calls appropriately, the child may then be rewarded with additional minutes to be used at his/her discretion.

When order options are desired by the subscriber, the controller 310 may access the service options database 325 for a list of available options. These options may be presented and displayed to the subscriber for selection. For example, a display screen on the service-providing device 300 may list the available options to be selected. If the service-providing device 300 is being accessed from the network 101 by the subscriber using a computer (via the Internet, for example), the same list may be displayed on the first party's computer screen.

Once the order is completed, the subscriber is charged for the service and an appropriate billing mechanism is utilized using the billing device 335.

FIG. 5 shows a flowchart of an exemplary process of the controller 310. In step 1000, the controller 310 is contacted by the subscriber and continues to step 1002. In step 1002, a determination is made on whether a service is ordered. If a service is ordered, the controller 310 continues to step 1004. Otherwise, the controller 310 jumps to step 1026. In step 1004, the service order is received and the controller 310 then goes to step 1006. In step 1006, information on the subscriber is obtained and the controller then goes to step 1008 where information on the third-party recipient is obtained.

Next, in step 1010, a determination is made whether conditions are to be attached to the service being ordered. If conditions are to be attached, controller 310 then goes to step 1012. Otherwise, the controller 310 jumps to step 1014. In step 1012, conditions are attached to the service. Controller 310 then goes to step 1014 where a determination is made on the attachment of rewards to the use of the service. If rewards are to be attached, controller 310 then goes to step 1016. Otherwise, the controller 310 jumps to step 1018. In step 1016, the rewards are attached to the service and the controller 310 then goes to step 1018.

In step 1018, the subscriber is billed for the service. Controller 310 then goes to step 1020 where the controller 310 transmits notification to the third party about the service. The controller 310 goes to step 1022 where the service is provided to the third party before going to step 1024 where the operation ends.

In step 1026, an error message is sent to the first party. The error message can be specific to the error that occurred in step 1002 or can merely be a generic error message. The controller 310 then continues to step 1024 where the operation ends.

While this invention has been described in conjunction with specific embodiments thereof, it is evident that many alternatives, modifications and variations will be apparent to those skilled in the art. Therefore, exemplary embodiments of the invention as set forth herein are intended to be illustrative and not limiting. Various changes may be made without departing from the spirit and scope of the invention.

What is claimed is:

1. A method comprising:
receiving an order request for service from a first terminal, the order request comprising:
  a first parameter associated with the service, wherein the first parameter comprises a designation for a second terminal to consume the service within a predetermined period of time;
  a designation of a reward for the second terminal as an incentive to consume the service;
  a condition associated with the service, the condition allowing the second terminal to modify the first parameter; and
  an identification of the second terminal;
in response to receiving a request from the second terminal, modifying the first parameter associated with the service in conjunction with the condition;
providing the service to the second terminal;
monitoring a consumption of the service by the second terminal;
providing the reward to the second terminal, the reward being amended in response to modifying the first parameter associated with the service; and
sending a report based on the monitoring to the first terminal.

2. The method of claim 1, further comprising:
receiving from the first terminal a customized message to be transmitted at a specified time to the second terminal as an alert indicating that the service has been purchased for the second terminal;
transmitting, at the specified time, the customized message to the second terminal indicating that the service has been purchased for the second terminal.

3. The method of claim 1, further comprising:
transmitting a notification to the first terminal in response to determining that the second terminal consumed the service.

4. The method of claim 1, wherein the reward comprises a preset amount of credit.

5. The method of claim 1, wherein the service comprises a pay-per-view movie.

6. The method of claim 1, wherein the first terminal is located remotely from the second terminal.

7. An apparatus for providing a service comprising:
a controller; and a memory to store computer program instructions, the computer program instructions, when executed on the controller, cause the controller to perform operations comprising:
- receiving an order request for service from a first terminal, the order request comprising:
  - a first parameter associated with the service, wherein the first parameter comprises a designation for a second terminal to consume the service within a predetermined period of time;
  - a designation of a reward for the second terminal as an incentive to consume the service;
  - a condition associated with the service, the condition allowing the second terminal to modify the first parameter; and
  - an identification of the second terminal;
- in response to receiving a request from the second terminal, modifying the first parameter associated with the service in conjunction with the condition;
- providing the service to the second terminal;
- monitoring a consumption of the service by the second terminal;
- providing the reward to the second terminal, the reward being amended in response to modifying the first parameter associated with the service; and
- sending a report based on the monitoring to the first terminal.

8. The apparatus of claim 7, the operations further comprising:
- receiving from the first terminal a customized message to be transmitted at a specified time to the second terminal as an alert indicating that the service has been purchased for the second terminal;
- transmitting, at the specified time, the customized message to the second terminal indicating that the service has been purchased for the second terminal.

9. The apparatus of claim 7, the operations further comprising:
- transmitting a notification to the first terminal in response to determining that the second terminal consumed the service.

10. The apparatus of claim 7, wherein the reward comprises a preset amount of credit.

11. The apparatus of claim 7, wherein the service comprises a pay-per-view movie.

12. The apparatus of claim 7, wherein the first terminal is located remotely from the second terminal.

13. A tangible computer readable medium storing computer program instructions, which, when executed on a controller, cause the controller to perform operations comprising:
- receiving an order request for service from a first terminal, the order request comprising:
  - a first parameter associated with the service, wherein the first parameter comprises a designation for a second terminal to consume the service within a predetermined period of time;
  - a designation of a reward for the second terminal as an incentive to consume the service;
  - a condition associated with the service, the condition allowing the second terminal to modify the first parameter; and
  - an identification of the second terminal;
- in response to receiving a request from the second terminal, modifying the first parameter associated with the service in conjunction with the condition;
- providing the service to the second terminal;
- monitoring a consumption of the service by the second terminal;
- providing the reward to the second terminal, the reward being amended in response to modifying the first parameter associated with the service; and
- sending a report based on the monitoring to the first terminal.

14. The tangible computer readable medium of claim 13, the operations further comprising:
- receiving from the first terminal a customized message to be transmitted at a specified time to the second terminal as an alert indicating that the service has been purchased for the second terminal;
- transmitting, at the specified time, the customized message to the second terminal indicating that the service has been purchased for the second terminal.

15. The tangible computer readable medium of claim 13, the operations further comprising:
- transmitting a notification to the first terminal in response to determining that the second terminal consumed the service.

16. The tangible computer readable medium of claim 13, wherein the reward comprises a preset amount of credit.

17. The tangible computer readable medium of claim 13, wherein the service comprises a pay-per-view movie.

18. The tangible computer readable medium of claim 13, wherein the first terminal is located remotely from the second terminal.

* * * * *